Sept. 26, 1950        M. GOLDSTEIN        2,523,757
MARKING DEVICE
Filed Sept. 16, 1949
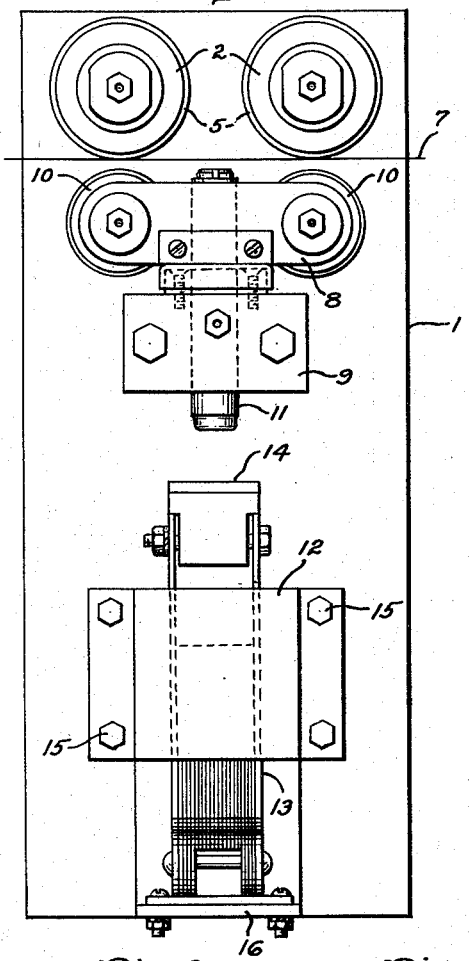
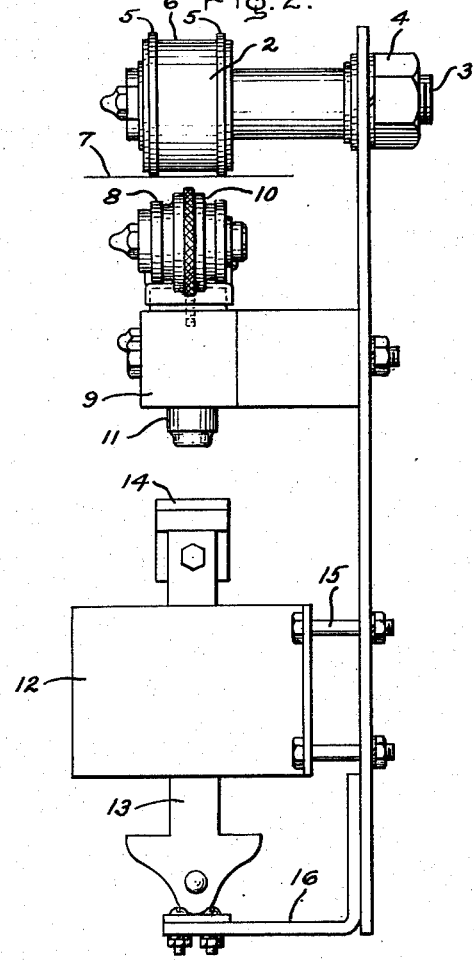
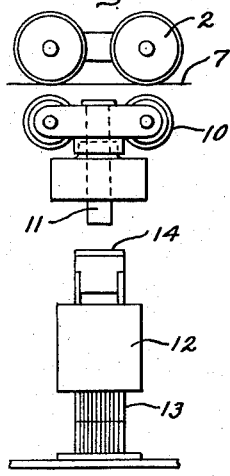
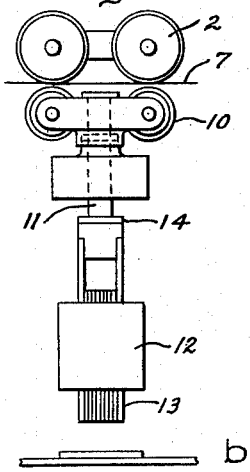
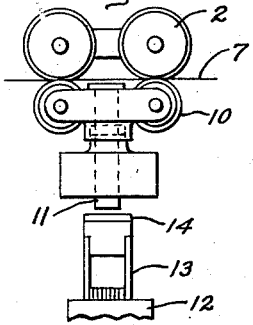
Inventor:
Max Goldstein,
by Claude N. Mott.
His Attorney.

Patented Sept. 26, 1950

2,523,757

UNITED STATES PATENT OFFICE 2,523,757

MARKING DEVICE

Max Goldstein, Schenectady, N. Y., assignor to General Electric Company, a corporation of New York Application September 16, 1949, Serial No. 116,048

2 Claims. (Cl. 101—4)

This invention relates to marking devices and in particular to an improved apparatus for physically identifying defects in strips of tin plate or other moving strips of sheet material.

In the tin plate industry where the product is to be used for food containers, it is of primary importance that the metal be perfect and contain no pinholes of any sort.

Pinhole detecting devices usually employ a light beam which is projected from a scanning head onto a moving strip of tin plate passing thereunder. When the beam of light passes through an aperture in the tin plate, a signal is initiated which can be amplified and used to ring a bell or the equivalent.

The detection of pinholes is not enough to satisfy the industry, however, since it also requires that the location of pinholes be marked in a manner that will physically identify the section of the material containing the pinhole. The defective section is then discarded; consequently it is imperative that the pinhole be closely defined.

While pneumatic and solenoid operated defect markers have been used in the past, an improved device is sought by the trade that does not drag along the tin plate and mar its finish after the defect has been marked. The ideal marker, of course, would be one that would mark the tin place exactly at the defect and make no other scratch or blemish on it. If this were done, then only a strip of metal the width of the defect need be discarded.

It is an object of this invention to provide an improved tin plate marking device.

It is a further object of this invention to provide a device that places on defective tin plate a mark of nearly constant length no matter what the speed of the tin plate passing through the apparatus.

It is a still further object of this invention to provide an improved apparatus that correctly identifies defective tin plate and yet blemishes a minimum amount of the tin plate strip.

Broadly this invention comprises an apparatus that acts in response to a signal from a scanning head that has detected a flaw in tin plate passing thereunder. The signal is employed to actuate a solenoid operated marking device that identifies the flaw in a manner that facilitates the discarding of the defective strip.

Further objects and advantages of this invention will become apparent and the invention will be better understood from the following description referring to the accompanying drawings, and the features of novelty which characterize this invention will be pointed out with particularity in the claims annexed to and forming a part of this specification.

Referring to the drawings, Fig. 1 is a front elevation of the improved marking device; Fig. 2 is a side elevation view of the improved marking device; while Fig. 3, Fig. 4, and Fig. 5 are elevation views of the improved marking device in the operative stages of marking of pieces of defective tin plate.

Referring to the drawings, a panel 1 is provided with a pair of die rollers 2 mounted on studs 3, which in turn are fastened to the panel by nuts 4. Rubber tires 5 are secured to opposite ends of rollers 2. The tires, during normal operation, prevent any contact of rollers 2 with a tin plate strip 7 passing thereunder. Between tires 5, the smooth metal surface 6 of rollers 2 acts as a backing plate for the marking of the tin plate when it is so desired. Rollers 2 are mounted on studs 3 in a manner, such as by ball bearings, that permits free rolling thereof as the tin plate 7 passes under the rollers in frictional engagement with the rubber tires.

Below rollers 2 a yoke 8 is mounted by means of a bracket 9 on panel 1. The yoke comprises a pair of marking wheels or rollers 10 having knurled surfaces and being in spaced alignment below rollers 2. Yoke 8 is mounted on a rod 11 which is axially movable in and which is supported by bracket 9. If rod 11 is moved vertically upward with enough force, it carries with it yoke 8 and knurled rollers 10 which strike tin plate 7 forcing it against the smooth surface 6 of rollers 2.

A solenoid 12 is mounted on panel 1 below rod 11. The solenoid is provided with an armature 13 that carries a hammer 14 at its upper end. When solenoid 12 is energized, armature 13 is drawn up into the solenoid and hammer 14 is caused to strike rod 11 driving yoke 8 and attached rollers 10 towards rollers 2.

Solenoid 12 is positioned below rod 11 a distance that allows yoke 8 and marking wheels 10 to be slightly spaced from rollers 2 when the solenoid is energized and hammer 14 is in contact with rod 11.

Solenoid 12 is positioned on panel 1 by bolts 15, while armature 13 of solenoid 12 is maintained in the open position by an arm 16 which extends horizontally out from panel 1, and which is fastened thereto by any suitable means, such as by welding.

In the installation of the marking device, a time delay apparatus (not shown) which sends an operating signal to solenoid 12 is electrically positioned between a scanning head (not shown) and solenoid 12. The time delay apparatus, which is in no way the subject matter of this invention, might be such as that shown by Cockrell in United States Patent 2,264,873. The time delay apparatus functions relative to the speed of the tin plate passing through the scanning head. The time delay is inversely proportional to the speed; consequently, when the material is passing through at a high rate of speed, the solenoid is energized with less delay than if the material were passing through at a slow rate of speed. The time delay apparatus enables the solenoid to function at a time when the defective material is in position to be marked by the operation of the solenoid.

The operation of this invention apparatus can best be understood by reference to Figs. 3, 4, and 5 of the drawing. Assume that the tin plate has passed through a scanning head and that a fault had been discovered which initiated the operation of the time delay signaling apparatus. Solenoid 12 is energized by the time delay apparatus in time to place a mark on the tin plate when the defective portion is in the vicinity of rollers 2. Fig. 3 shows the apparatus in the normal open position just before solenoid 12 is energized. When solenoid 12 is energized, as shown in Figs. 4 and 5, armature 13 is drawn up into the closed position. Hammer 14 on armature 13 strikes rod 11 just before the fully closed position is reached. (See Fig. 4.) The blow from hammer 14 causes rod 11 to move upward carrying with it yoke 8 and marking wheels 10. The momentum of the blow causes yoke 8 and marking rollers 10 to travel to the position where the rollers 10 strike the tin plate. (See Fig. 5.) Since rollers 10 are knurled, a mark is placed on the tin plate by each of rollers 10. The tin plate is pressed up against the smooth surface 6 of rollers 2 during the marking. It is to be noted that hammer 14, attached to armature 13, does not travel a distance that causes rod 11 to press knurled rollers 10 against the smooth surface 6 of rollers 2. Instead, it is the momentum of the original blow by the hammer that causes rollers 10 to strike sharply the tin plate against smooth surface 6 of rollers 2. With this construction, the marking rollers 10 are not held against the surface 6; instead there is a strike and yoke 8, rod 11 and rollers 10 rebound to the position shown in Fig. 4, which is the operative position for the energized solenoid 12.

Fig. 5 depicts the marking rollers 10 against the tin plate and surface 6 of rollers 2. As has been mentioned, this is merely an instantaneous position; the rollers and yoke rebound from the position shown in Fig. 5 and the mark does not continue along the tin plate.

It is to be understood that with the subject type arrangement when solenoid 12 is energized, two marks are placed on the tin plate running through the apparatus (one by each marking roller 10). No matter what the speed of the material passing through the apparatus, the marks placed thereon identify practically a uniform strip that defines the defect. Tests have shown that for the highest rate of material passing through the apparatus (in the neighborhood of 1500 feet per minute), the mark on the metal is only one and one-half inches maximum greater than the spacing between marking rollers 10.

When the material has been marked by the subject defect identifying apparatus, it is a matter of simplicity to shear away the pinhole portion, insuring the fact that no defective material is sent into the finished process for which the tin plate is to be used.

Modifications of this invention will occur to those skilled in the art and it is desired to be understood, therefore, that this invention is not to be limited to the particular arrangement disclosed, but that the appended claims are meant to cover all modifications which are within the spirit and the scope of this invention.

What I claim as new and desire to secure by Letters Patent of the United States is:

1. In a marking device for a travelling strip of sheet material, a pair of rollers spaced along the sheet material, a pair of tire portions axially spaced on each of said rollers, said tire portions adapted to frictionally engage the sheet material passing in engagement therewith, a pair of marking wheels cooperating with said rollers and operatively positioned therefrom, said marking wheels being supported by and movable with a movable supporting means, a solenoid operated hammer for striking said movable supporting means whereby said marking wheels and the sheet material are driven against said pair of rollers when said solenoid is energized.

2. In a marking device for a travelling strip of sheet material, a pair of rollers spaced along the sheet material, a pair of tire portions axially spaced on each of said rollers, said tire portions adapted to frictionally engage the sheet material passing in engagement therewith, a pair of marking wheels cooperating with said rollers and positioned to allow the travelling strip to pass between each roller and cooperating marking wheel, a movable supporting means for said marking wheels, a solenoid and a solenoid armature having a hammer fixed to an end thereof operatively positioned with respect to said movable supporting means, said hammer striking said movable supporting means when said solenoid is energized, whereby said movable supporting means is driven to strike said marking wheels against the sheet material and said pair of rollers.

MAX GOLDSTEIN.

No references cited.